United States Patent [19]

Cieslak et al.

[11] 4,234,964
[45] Nov. 18, 1980

[54] RADIO RECEIVER MONITORING AND TESTING APPARATUS

[75] Inventors: Richard F. Cieslak, Algonquin; John V. Balding, Palatine; Joseph Lafrenz, Schaumburg, all of Ill.

[73] Assignee: Industrial Electronics Service Company, Schaumburg, Ill.

[21] Appl. No.: 948,054

[22] Filed: Oct. 2, 1978

Related U.S. Application Data

[62] Division of Ser. No. 795,778, May 11, 1977, Pat. No. 4,143,323.

[51] Int. Cl.³ .............................................. H04B 17/00
[52] U.S. Cl. ..................................... 455/226; 455/67; 332/39
[58] Field of Search ...................... 325/363, 364, 2, 41, 325/67, 133, 134, 147; 332/38, 39

[56] References Cited

U.S. PATENT DOCUMENTS

| | | | |
|---|---|---|---|
| 2,548,635 | 4/1951 | Summerhayes | 332/39 |
| 3,412,388 | 11/1968 | Barton | 340/248 |
| 3,736,510 | 5/1973 | Wu | 325/363 |
| 3,745,465 | 7/1973 | Stover | 325/363 |
| 3,992,670 | 11/1976 | Gittins | 325/134 |

Primary Examiner—Benedict V. Safourek
Assistant Examiner—Tommy P. Chin
Attorney, Agent, or Firm—McWilliams, Mann & Zummer

[57] ABSTRACT

Circuitry for attachment to a radio receiver to monitor and test a detected intermediate frequency signal and an audio signal from a demodulator portion of the receiver to determine whether a transmitted radio frequency signal is within frequency tolerances and modulation limits and to provide an alarm, either visual or audio, when the limits or tolerances are exceeded. An off frequency monitor tests the DC component of the radio demodulator detected IF signal and includes input signal conditioning circuitry for filtering the audio signal, high impedance for minimal loading of the radio, and level shifting. Upper and lower level voltage references indicate maximum permissible frequency deviation from the nominal transmitting frequency. Upper and lower level comparators compare the conditioned direct current (DC) signal to the respective voltage references and provide a changed output state upon an out of tolerance transmission. An over modulation detector, generally in parallel with the off frequency monitor, provides a changed output state of a minimum time duration whenever the modulation limits are exceeded, and includes AC coupling to block the DC component of the radio detector signal, a voltage reference indicative of the maximum modulation level, a comparator for comparing the audio signal to the voltage reference, pulse stretching circuitry to provide a minimum time duration output for intermittent over modulation conditions. The frequency monitor and modulation detector independently control switching of alarm circuitry to enable either a light emitting diode, or a volume controlled audio oscillator.

7 Claims, 2 Drawing Figures

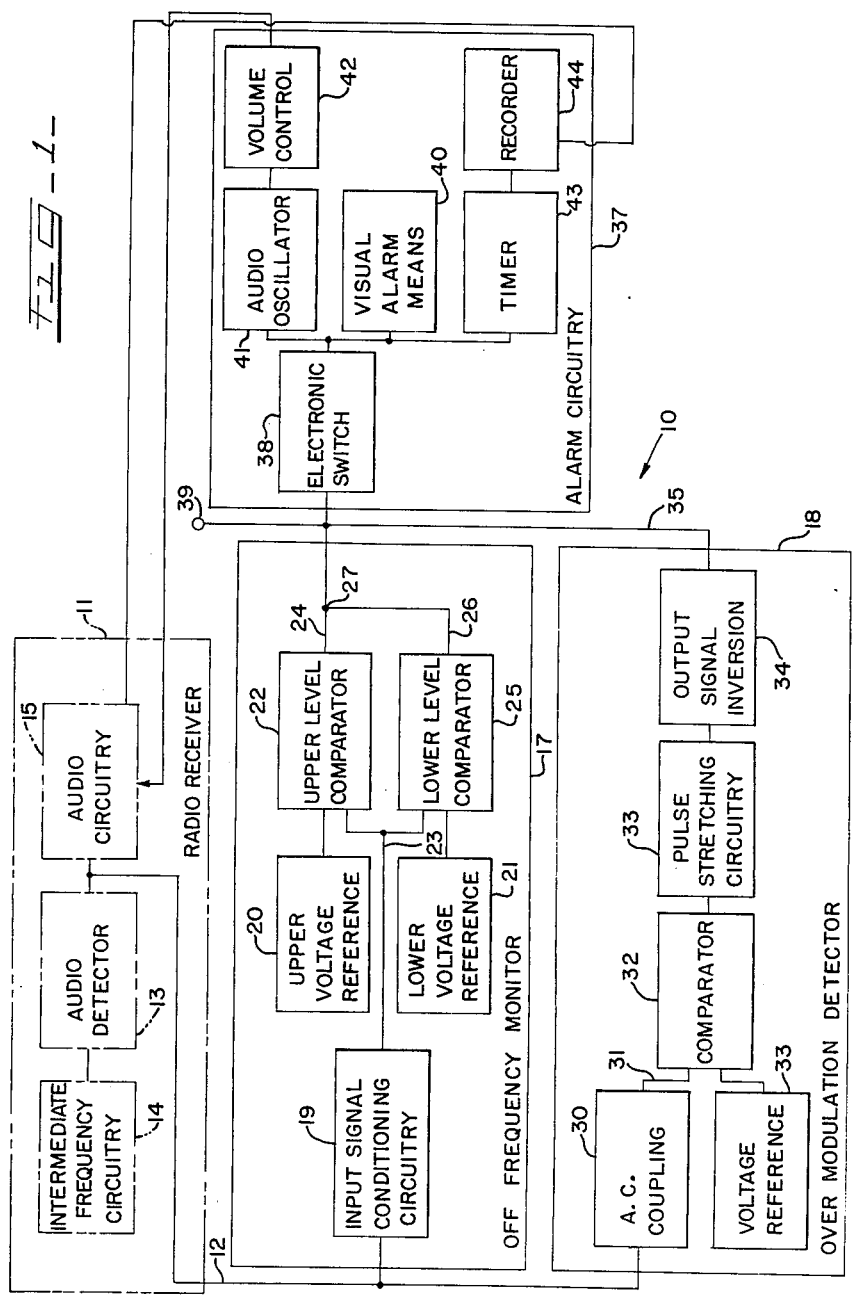

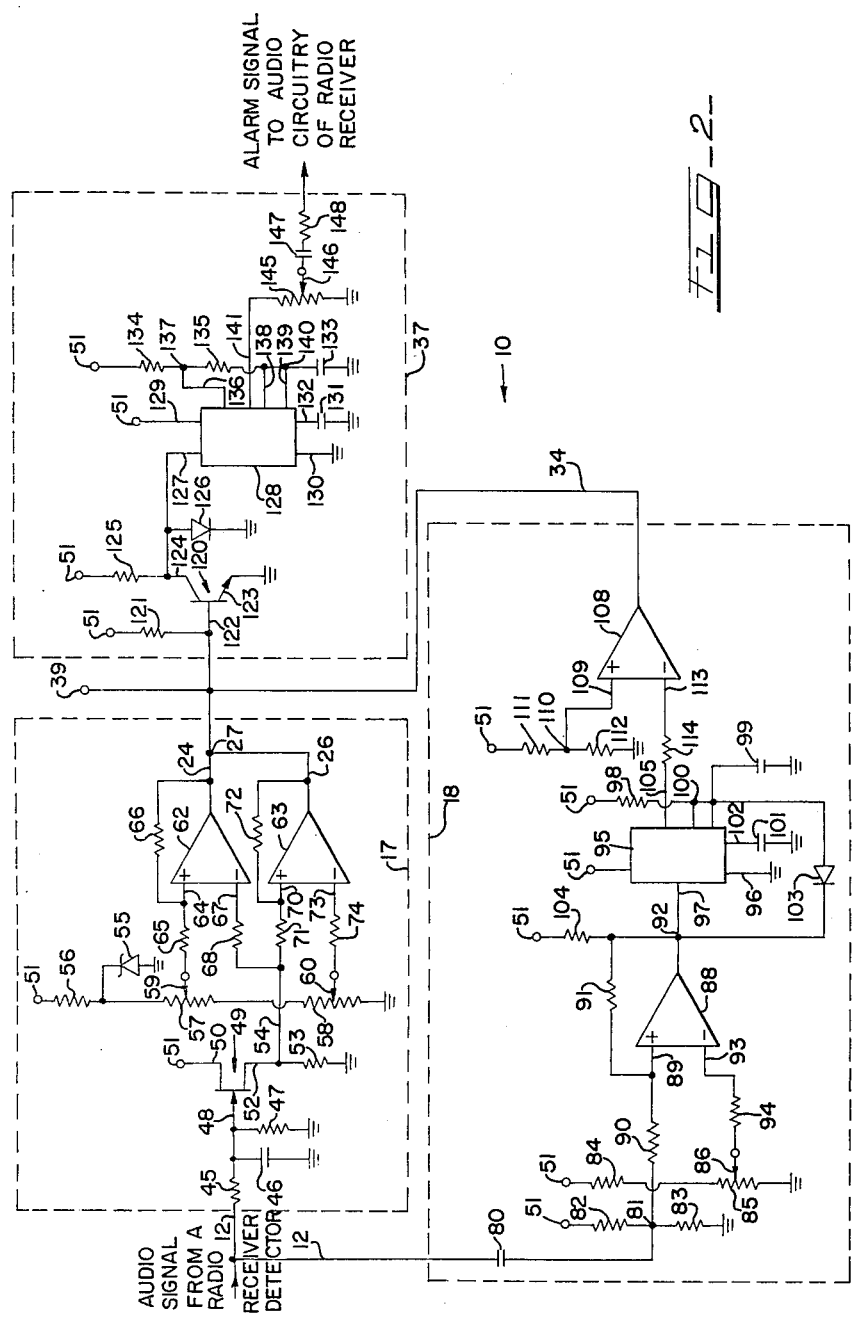

RADIO RECEIVER MONITORING AND TESTING APPARATUS

This is a division, of application Ser. No. 795,778, filed Apr. 11, 1977, now U.S. Pat. No. 4,143,323.

BACKGROUND OF THE INVENTION

This invention relates in general to radio receiver monitoring and testing circuitry, and more particularly to radio receiver monitoring and testing circuitry which determines if a radio frequency transmitted to the radio receiver is within frequency tolerances and modulation limits by monitoring and testing a detected intermediate frequency (IF) signal from the demodulator portion of a radio receiver.

In the past, the Federal Communications Commission (FCC) has required periodic testing of radio transmitting equipment for determining whether the radio frequency signal of the transmitting equipment was within the prescribed frequency tolerances and modulation limits. The frequency tolerances vary depending upon the frequency spectrum being used. Generally, the percentage of permissible error in the transmitting frequency is very small and is further dependent upon the frequency being used. For example, 0.01% error may be acceptable at 25 MHz, but this gradually decreases to 0.0005% at 150 MHz and further to 0.00015% at 810 MHz. Crystal controlled oscillators can initially satisfy such tight frequency tolerances. However, aging and other phenomena can cause the crystal frequency to drift with the passage of time, temperature changes and the like.

As is known to those skilled in the art, the radio frequencies are divided into different bands and numerous transmitting frequencies are assigned to various operators of transmitting equipment. Exacting frequency tolerances and modulation limits are required so that the transmitted signal does not cause appreciable noise or interference with the signal transmitted from an adjacent operating frequency. That is, small deviations in the transmitted signal from the center frequency will cause noise in the signal received from an adjacent center frequency, but as the deviations become greater, portions of the transmitted signal will begin to interfere with the signal at the adjacent center frequency.

Annual inspection of transmitting equipment for frequency tolerances and modulation limits is an expensive procedure. The testing equipment must have greater accuracy than the transmitting equipment to determine what degree of error is present and such sophisticated test equipment usually requires operation by trained and licensed personnel. Furthermore, testing requirements specified by the FCC generally require that the transmitting equipment be disconnected and brought to the testing location, and after the test, reinstallation is required.

Due to the ever increasing use of two way communication equipment, the burden for maintaining the accuracy of the frequency and modulation of the transmitter is now placed upon the owner. However, the FCC continues to seek out operators of offending equipment. Offenders are subject to fines, imprisonment, and loss of licenses. In addition, once an FCC citation issues, considerable additional costs are incurred in preparing replies and responses to the government.

Many businesses utilize a plurality of two way radio transmitters and receivers, often called transceivers, for maximum efficiency in utilization of manpower and equipment. In such instances, the cost of testing and maintaining the radio equipment within the prescribed specifications is multiplied by the number of transmitters in use. Similarly, the probability that at least one of the transmitting units is out of specification increases as the number of units in use increases.

SUMMARY OF THE INVENTION

Rather than attempting to test radio frequencies with the low percentages of error associated therewith, the present invention monitors and tests the detected IF signal from the audio detector portion of a radio receiver or transceiver. This enables the circuitry of the invention to be applicable to any radio receiver independent of the radio frequency range or setting of the particular receiver. The circuitry of the invention is also independent of the type of modulation used, i.e. amplitude modulation (AM) or frequency modulation (FM). Furthermore, the additional problems associated with radio frequencies of circuitry stability and high gain-bandwidth for the active circuit elements are greatly diminished. The invention can therefore be utilized with virtually any radio receiver without special tuning or periodic checking with respect to highly accurate frequency standards, as is the case with radio frequency test equipment.

An off frequency monitor portion of the circuitry tests the DC component of the detected IF signal recovered by the audio demodulator of the receiver. Input signal conditioning means has a high input impedance characteristic for minimal loading of the demodulator and audio frequencies are filtered from the detected signal to recover the DC component thereof. The input conditioning means may also incorporate a level shifting means to shift the DC level of the detected signal, which is nominally zero volts, to a nominally non-zero level. Upper and lower voltage references are provided which are representative of the maximum permissible frequency deviation from the desired center frequency of the transmitted radio frequency signal. Upper and lower level comparators, typically operational amplifiers, compare the output of the signal conditioning circuitry to the respective upper and lower voltage references. When an out of tolerance signal is received, one of the comparators changes its output state to enable an alarm means.

In another aspect of the invention, an over modulation detector monitors and tests the audio signal from the audio demodulator of the receiver to determine if the transmitted signal is within modulation limits. AC coupling circuitry blocks the DC component of the signal while passing the AC component thereof. The coupling circuitry may also add or superimpose a known and constant DC level to the AC component. A comparator, typically an operational amplifier, compares the magnitude of the audio signal to a voltage reference which is representative of the maximum permissible modulation. Upon an over modulation condition, the comparator will change output state. Because the changed output state of the comparator will be intermittent whenever the over modulation conditions are also intermittent, pulse stretching circuitry is utilized to provide an output signal of a minimum time duration whenever an intermittent over modulation condition is sensed by the comparator. Thus, the output of the pulse stretching circuitry is adapted to enable the alarm means for a sufficient duration of time such that the radio receiver operator is alerted to the over modulation condition even though it is intermittent.

The alarm circuitry provides either a visual or audio alarm signal upon receiving a changed output state from either the off frequency monitor or the over modulation detector. A light emitting diode can be used for the visual alarm. The audio alarm is provided by an audio oscillator which provides a fixed or pulsating tone which is fed back into the audio circuitry portion of the radio receiver. A volume control may be interposed between the audio oscillator and the audio circuitry to regulate the volume of the audio alarm.

The present invention has particular advantage with respect to two way communications where the radio receiver having the monitoring and testing circuitry of the invention receives transmitted signals of the same frequency from a plurality of transmitters. The circuitry of the invention is connected to a centrally located receiver, such as at a dispatching office. Under such conditions, the dispatcher can note whenever an offending transmitted signal is received and the transmitting source from which the signal came. Offending transmitters are thereby identified at an early date when the transmitter is first beginning to need adjustment or repair, which may be long before a typical annual testing procedure. Also, since other transmitters which are transmitting acceptable signals are continually being monitored by the circuitry of the invention, there is no need to subject those transmitters to annual testing procedures thereby saving much expense.

Various other objects, features and advantages of the invention will become apparent from the following detailed disclosure when taken in conjunction with the drawings.

BRIEF DESCRIPTION OF THE DRAWINGS

In the drawings:

FIG. 1 is a schematic block diagram of portions of the circuitry and the associated functions and further illustrating the interconnection of the circuitry with portions of a typical radio receiver; and FIG. 2 is a schematic circuit diagram of an embodiment of the invention.

DESCRIPTION OF THE PREFERRED EMBODIMENTS

Turning to FIG. 1, there is illustrated in block diagram form monitoring and testing circuitry, generally designated 10, for connection to a radio receiver 11. The circuitry 10 receives an audio signal on a line 12 from an output of an audio demodulator 13 of the receiver 11. It will be understood that the receiver 11 is not part of the invention, but is illustrated in the dashed lines of FIG. 1 to show the connections of the circuitry 10 to a receiver 11. Also, not all internal parts of the receiver 11 are illustrated, but only some of those parts which illustrate usage of the invention.

Besides the audio demodulator 13 of the receiver 11, other portions of the receiver 11 illustrated in FIG. 1 are the intermediate frequency circuitry 14 and the audio circuitry 15. The audio demodulator 13 is of primary interest in practicing the invention. It is typically a demodulator of the discriminator type which recovers the audio signal from an intermediate frequency signal or radio frequency signal. Other types of audio detectors 13 can also be utilized with the circuitry 10 including the slope and ratio types by minor circuitry changes as will be appreciated hereinafter.

The invention and the circuitry 10 take advantage of the fact that the detected IF signal and the recovered audio signal on the line 12 from the audio demodulator 13 can be monitored and tested to determine if the transmitted radio frequency is within tolerance and the modulation is within limits. If the transmitted frequency is not exact, a DC voltage level will appear on the line 12. This DC voltage level is representative of or proportional to the transmitting frequency error and the polarity will indicate the transmitter is transmitting at too high of a frequency, or too low.

On the other hand, the peak to peak AC magnitude of the recovered audio signal on line 12 is related to the modulation level of the transmitter. Thus, the AC component of the recovered audio signal can be monitored and tested to determine if the modulation is within prescribed limits.

It will be appreciated that the radio receiver 11 may also include transmitting circuitry as is common in two-way radio communications equipment. Such combination receivers and transmitters are often termed transceivers. It will be further appreciated that the signal being tested is received from a different or remote transmitter or transceiver.

Several advantages flow from testing the detected IF signal of a receiver rather than the radio frequency signal of the transmitter. A first advantage is that relatively simple and inexpensive circuitry can be used to achieve the testing function. Because audio frequencies or DC levels are being tested, there is no need for expensive and highly accurate radio frequency test equipment. Furthermore, problems of circuit stability at high radio frequencies is either avoided or greatly diminished. The radio receiver 11 can be centrally located, as at a dispatching office, whereby large numbers of transmitters can be continuously monitored and tested. This is of great economic value where use of a plurality of transmitters continuously tests the signal of the transmitters rather than providing periodic annual tests or the like for each individual transmitter. Since each transmitter is continually being tested whenever it transmits a radio signal, problems with respect to frequency or modulation accuracy are discovered when the transmitter first begins to cause such problems rather than at a much later date as would typically be the case under an annual inspection program. Any removal and reinstallation of the transmitter to facilitate inspection is also avoided. The invention also reduces manpower costs since the testing function is combined with the dispatching or similar function and no special training of personnel is required as is the case in the operation of sophisticated radio frequency test equipment. Since only a small proportion of the total number of transmitters fail to operate within prescribed frequency or modulation limits, much conventional testing which turns out to be useless, because the transmitter is operating within the prescribed limits, is avoided. Furthermore, since the detected intermediate frequency and audio signals are tested, the type of modulation used by the transmitter and the type of demodulation used by the receiver are not of particular importance, which is not the case in the testing of radio frequency signals.

Often in better communications equipment, the output of the audio detector 13 is readily available, as by jacks at the back of the receiver 11, so that the connection of the circuitry 10 thereto does not pose any special problems.

Returning to the block diagram of FIG. 1, the detected IF signal and the recovered audio signal on line 12 are presented to an off frequency monitor 17 and to an over modulation detector 18, generally in parallel relation to the off frequency monitor 17. The off frequency monitor 17 monitors and tests the DC component of the detected IF signal recovered by the audio demodulator 13 of the receiver 11. A portion of the monitor 17 includes input signal conditioning circuitry 19. Typically, the signal conditioning circuitry 19 will be preferably have a high input impedance for minimal loading of the demodulator 13 and will further filter the audio frequencies on line 12 to recover only the DC component thereof. The circuitry 19 may optionally provide a level shifting function to internally shift the DC potential line 12, which is nominally zero, to some non-zero value. This avoids testing both positive and negative DC potentials which would require circuitry biased from both positive and negative voltage supplies (not shown). However, if the DC level line 12 is internally shifted in block 19 to a suitable non-zero value, the testing may be done with circuitry biased from a single voltage supply.

The off frequency monitor 17 further includes an upper voltage reference 20 and a lower voltage reference 21. The voltage references 20, 21 are representative of the maximum permissible frequency deviation in either direction from the nominal transmitting frequency and the exact values thereof are dependent upon the signal received on line 12 from the demodulator 13 and the characteristics of the signal conditioning circuitry 19. An upper level comparator 22 compares the output of the signal conditioning circuitry on line 23 to the upper voltage reference 20, with the upper level comparator 22 providing a changed output state on line 24 whenever the signal on line 23 exceeds the upper voltage reference 30. Similarly, a lower level comparator 25 compares the output of the signal conditioning circuitry 19 on line 23 to the lower voltage reference 21 and provides a changed output state on line 26 whenever the signal on line 23 is less than the lower voltage reference 21. The output state of the comparators 22, 25 are combined at a junction 27 in a manner that enables either of the comparators 22, 25 to control the output state of the off frequency monitor 17.

The recovered audio signal on line 12 is also presented to the over modulation detector 18 to test and monitor the AC component of the recovered audio signal to determine if the transmitted radio signal is within modulation limits. An AC coupling circuit 30 blocks the DC component of the detected IF signal on line 12 while transmitting the AC audio signal. The AC coupling circuit 30 may optionally include level shifting or DC biasing of its output on line 31 to avoid comparison of an audio signal centered about a zero DC level. A comparator 32 compares a voltage reference 33, representative of the maximum permissible level of modulation of the transmitted radio signal, to the signal on line 31 from the AC coupling circuit 30. Since the comparator 32 is examining the modulation level of an audio signal, any over modulation may be intermittent rather than continuous. Pulse stretching circuitry 33, which receives the output of the comparator 32, provides a changed output state of a minimum time duration whenever an intermittent over modulation condition is received from the comparator 32. Depending upon the output signal of the pulse stretching circuitry 33, output signal inversion 34 may be desirable to have the output of the over modulation detector 18 on the line 35 compatible with the output of off frequency monitor 17 at the junction 27. Since an out-of-frequency tolerance condition may not necessarily be associated with an over modulation condition in the transmitted radio frequency signal, and vice versa, it is desirable to have the output signals of the over modulation detector 18 and the off frequency monitor 17 independently control the alarm circuitry 37.

The alarm circuitry 37 has an electronic switch 38 responsive to a changed output state of either the off frequency monitor 17 at the junction 27 or the over modulation detector 18 on the line 35. Additionally, the electronic switch 38 may also be responsive to other types of alarms not associated with the monitoring and testing of the recovered audio signal, as at a terminal 39. Additional alarm conditions at the terminal 39 may include, but are not limited to, smoke and fire alarms, burglar alarms, and the like. The electronic switch 38, upon receiving a changed output state from the off frequency monitor 17, the over modulation detector 18, or the terminal 39, enables a visual alarm means 40 and or an audio oscillator 41. The visual alarm means 40 could take the form of any of a variety of visual means, including, but not limited to, incandescent lamps, light emitting diodes or the like. Rather than using a separate amplifier, speaker and the like to present the audio alarm from the audio oscillator 41, an output of the audio oscillator may be fed back into the radio receiver 11 to the audio circuitry 15 portion thereof. Preferably this includes a volume control 42 interposed between the audio oscillator 41 and the audio circuitry 15 to independently control the volume of the audio alarm from that of the normal audio level of a radio receiver 11.

The electronic switch 38 is also capable of switching or enabling variety of other alarm or associated devices. One such device is a combination of a timer 43 and a recorder 44 for recording the audio portion of the out of tolerance radio transmission. Such procedure is especially useful for later identification of the radio transmitter, as where the operator is busy at the time of the transmission or not present. This ensures that all out of tolerance transmissions will be identified, independently of the operator's ability to identify or record the same. The timer 43 provides a sufficient recording time interval for identification purposes since, as previously discussed, the electronic switch 38 may change to the alarm state for relatively short intervals where intermittent over modulation is present. The timer 43 could be a solid state device for directly controlling the recorder 44 or could control an electromechanical device (not shown), such as a relay, for activating the recorder 44.

The preferred embodiment of the invention is illustrated in the schematic circuit diagram of FIG. 2. Turning first to the off frequency monitor portion 17 of the circuitry 10, the detected IF signal from the demodulator of a radio receiver is presented to a resistor 45 by the line 12. The other end of resistor 45 is referenced to ground through a capacitor 46 and another resistor 47. The other end of the resistor 45 if also connected to a gate terminal 48 of a field effect transistor, generally designated 49. The resistors 45, 47 and capacitor 46 are chosen to properly bias the gate terminal 48 of the FET 49 and to filter the audio signal to recover the DC component thereof. Resistor 46 is typically chosen to be a relatively high value, such as 100 kilo-ohms, to minimize the size of capacitor 46 for proper filtering of the audio signal. It is also preferable that resistor 46 have a high resistive value to minimize any loading of the audio demodulator 13 of the radio receiver 11.

The FET 49 is of the N-channel type. The high input impedance at the gate terminal 48 further avoids any loading effects on the radio receiver circuitry. A drain terminal 50 of the FET 49 is referenced to a positive voltage source (not shown) through a terminal 51. A source terminal 52 of the FET 49 is connected through a resistor 53 to ground. The DC component of the detected IF signal which was presented to the FET 49 at the gate terminal 48 is thus shifted upwardly in DC potential which appears on a lead 54 connected between the source terminal 52 of the FET 49 and the resistor 53. Such level shifting avoids testing of the DC component of a detected IF signal for both positive and negative excursions, which would in most instances require circuitry biased from both positive and negative voltage supplies. Thus, the level shifting technique presents the DC component on lead 54 whereat the DC component varies about a non-zero DC level, such as +2.0 volts.

While all of the circuitry 10 of the invention operates from a single positive voltage supply, as at the terminal 51, it would be readily appreciated by those skilled in the art that the circuitry 10 could through appropriate changes operate from a single negative voltage supply instead.

The voltage references for comparison of the DC component on lead 54 are generated in the following manner. A zener diode 55, for providing a stable voltage, has an anode terminal referenced to ground and a cathode terminal connected through the resistor 56 to the positive voltage supply at terminal 51. The cathode terminal of the zener diode 55 is also connected to ground through the series combination of voltage dividing resistors 57, 58. The resistors 57, 58 are preferably adjustable resistors with wiper arms 59, 60, respectfully. The wiper arms 59, 60 are variable adjusted such that the wiper 59 is adjusted to the maximum permissible positive deviation of the DC component present on the lead 54 and the wiper arm 60 is adjusted to the maximum permissible negative deviation of the DC component of the signal on lead 54. The wiper arms 59, 60 also compensate for other circuitry variables including the tolerance of the zener diode 55 from its nominally rated zener voltage and the nominal DC level shifting at lead 54 due to the characteristics and biasing of the FET 49. The potential present at the wiper arm 59 thus constitutes the upper voltage reference while the potential present at the wiper arm 60 constitutes the lower voltage reference.

A pair of operational amplifiers 62, 63 function as respective upper and lower level comparators to compare the voltage level at lead 54 to the upper voltage reference and to the lower voltage reference. The amplifier 62 has its non-inverting input 64 connected through a resistor 65 to the wiper arm 59 and through a feedback resistor 66 to the lead 24 which is connected to the output of the amplifier 62. An inverting input 67 of the amplifier 62 is connected through a resistor 68 to the lead 54. Amplifier 62 thus continuously monitors the potential at the lead 54 to the upper voltage reference at the wiper arm 59 and changes its output state on lead 24 whenever the potential on lead 54 exceeds the upper voltage reference at the wiper arm 59. Such a condition is indicative that a transmitted radio frequency signal received by the radio receiver 11 is out of tolerance in one direction from the nominal transmitting frequency.

Amplifier 63 has its non-inverting input 70 connected through a resistor 71 to the lead 54 and through a feedback resistor 72 to the lead 26 which is connected to the output of amplifier 63. An inverting input 73 of the amplifier 63 is connected through a resistor 74 to the wiper arm 60. Thus whenever the DC potential on line 54 drops below the lower voltage reference present at the wiper arm 60, amplifier 60 changes its output state at lead 26. Such a condition is indicative that the transmitted radio frequency received by the radio receiver 11 is out of tolerance in an opposite direction from its nominal transmitting frequency. The resistors 65, 66 and the resistors 71, 72 are selected to set the gain of the respective amplifiers 62, 63 to appropriate values. Resistor 68 and resistor 74 are selected to nearly equal the impedance seen looking into the respective resistors 65, 71 which are connected to the other input terminals of the respective amplifiers 62, 63 to avoid any drift in the point at which the amplifiers 62, 63 will change state due to the internal characteristics thereof. Resistors 66, 72 are preferably of high ohmic values and provide hysteresis for a rapid transition between high and low output state of the respective amplifiers 62, 63 to prevent amplifiers 62, 63 from oscillating during the transition. Since the inputs 70, 73 of the amplifier 63 may be current sensitive, resistors 65, 68, 71 74 are also chosen to provide desired current levels for given voltages. Resistors 68, 74 are additionally selected to approximate the paralleled value of the resistors 65, 66 and resistors 71, 72, respectively.

The leads 24, 26 of the respective amplifiers 62, 63 are joined at a junction 27 such that the output of the off-frequency monitor 17 will have a changed output state whenever the DC component of the detected IF signal from the detector portion of the radio receiver 11 indicates that an out frequency tolerance signal has been transmitted.

The over modulation detector 18 will now be considered. The recovered audio signal from the radio receiver 11 is also presented to the over modulation detector 18 via the lead 12. However, the over modulation detector 18 monitors and tests the audio portion of the recovered audio signal. To avoid any shifting of the audio signal which would introduce error into the peak to peak audio signal, a capacitor 80 is interposed in series connection in the line 12 to block any DC component from the radio receiver 11. The capacitor 80 is further connected at a junction 81 to a pair of voltage dividing resistors 82, 83. Resistor 82 has an opposite terminal connected to the positive voltage supply terminal 51 and resistor 83 has an opposite terminal connected to ground, such that the audio signal present at junction 81 is shifted to a known and stable DC level.

A voltage reference for comparison of the peak to peak excursion of the audio signal present at junction 81 is provided by the series connection of resistors 84 and 85 between the positive voltage supply terminal 51 and ground. Preferably the resistor 85 is adjustable with a wiper arm 86 which can be adjusted to establish a voltage reference at the wiper arm 86 which will be representative of the maximum permissible modulation level of the radio frequency signal received by the radio receiver 11. Since the modulation level is generally symmetric with respect to positive and negative peaks of the audio signal, only the positive or the negative peak excursions of the audio signal need to be monitored, and not both.

An operational amplifier 88 functions to compare the combination of the DC level peak to peak audio signal present at junction 81 to the voltage reference present at the wiper arm 86. Amplifier 88 has its non-inverting input 89 connected through a resistor 90 to the junction 81 and through a feedback resistor 91 to a junction 92 which is further connected to the output of the amplifier 88. An inverting input 93 of the amplifier 88 is connected through a resistor 94 to the wiper arm 86. Resistors 90, 91, 94 are selected based upon similar considerations as previously discussed with respect to the resistors 65, 66, 68, 71, 72, 74 of the amplifiers 62, 63. When an over modulation signal is received, the peak amplitude of the audio signal added to the nominal DC potential at terminal 81 will exceed the voltage reference at wiper arm 86 and cause the amplifier 88 to change to an opposite output state at the junction 92.

Because the amplifier 88 is monitoring an audio signal, i.e. an AC signal, the output state of the amplifier 88 at the junction 92 will remained changed only so long as the peak amplitude of the audio signal at junction 81 in combination with the DC level present thereat exceeds the DC potential at the wiper arm 86. Thus, over modulation may be intermittent and of such short duration that any alarm means or other indication of an over modulation condition will not be enabled for a sufficient duration of time to advise the presence of the over modulation condition. Thus, some means of providing an output of a minimum time duration to provide an adequate indication of the presence of intermittent over modulation is required. Thus, it may be said that the intermittent over modulation which may be present at the output 92 of the amplifier 88 is to be stretched in time to provide a pulse of minimum time duration.

The timer circuit 95 and its associated circuitry, to be further discussed, provide this pulse stretching function. A timer circuit 95 is an integrated circuit commercially available from a number of sources under the designation "555-Timer" including the Signetics Corporation of Sunnyvale, California. The circuit 95 receives power from the positive voltage power supply terminal 51 and is also referenced to ground through a lead 96. The circuit 95 has an input lead 97 connected to the junction 92. The timing function is facilitated by the series combination of a resistor 98 and a capacitor 99 connected between the voltage supply terminal 51 and ground, with a junction 100 between the resistor 98 and capacitor 99. The potential at the junction 100 will gradually rise as the capacitor 99 is charged with current through the resistor 98. A control voltage on another capacitor 101, connected to the circuit 95 through a lead 102, provides a control voltage for the circuit 95 in achieving its timing and hence pulse stretching function. A diode 103 with an anode terminal thereof connected to the junction 100 and a cathode terminal thereof connected to the junction 92 automatically reset the circuit 95 for the next signal from the amplifier 88. A resistor 104 is connected between the junction 92 and the voltage supply terminal 51 to supply positive DC voltage level to the input terminal 97 of the circuit 95 before the amplifier 88 detects an over modulation condition. The circuit 95 thus provides an output pulse of a minimum time duration sufficient to activate the alarm means for a sufficient amount of time such that intermittent over modulation at the junction 92 will be detected by the alarm means, as well as relatively continuous over modulation. For example, the output on line 105 could nominally be one-half second, minimum. However, the output on lead 105 will remain in a changed output state as long as subsequent over modulation conditions are detected within the nominal timing interval.

The output of the circuit 95 on line 105 is preferably compatible with the output of the off-frequency monitor 17 at the junction 27 such that the over modulation detector 18 and the off-frequency monitor 17 may independently control the alarm means. To this end an amplifier 108 has an output on line 35 which is compatible with that of the amplifiers 62, 63 at the junction 27. The amplifier 108 may also provide an inversion function if the output of the circuit 95 on lead 105 is not in a compatible phase with that of the amplifiers 62, 63. Amplifier 108 has a noninverting input 109 connected to a junction 110 between a pair of voltage dividing resistors 111 and 112. Resistors 111, 112 are connected in series between the voltage supply terminal 51 and ground. An inverting input 113 of the amplifier 108 is connected through a resistor 114 to the lead 105 and hence the output of the circuit 95. Thus, whenever the circuit 95 changes output state, the amplifier 108 will also change output state, thereby enabling the over modulation detector 18 to control the alarm means independent of the off-frequency monitor 17. The addition of the amplifier 108 is generally without much additional cost since semi-conductor manufacturers generally supply operational amplifiers in integrated circuit packages with either two or four operational amplifiers per package. Since the circuitry 10 otherwise uses three amplifiers 62, 63, 88, an additional amplifier for use as amplifier 108 is likely to be available without additional cost.

Turning now to the alarm circuitry 37, an electronic switch, such as the NPN transistor 120, is provided to be responsive to a change in output states of any of the amplifiers 62, 63, 108 or to a fault condition at a remote location, such as a fire sensor, security sensor or the like, connected to terminal 39. As with the amplifiers 62, 63, 108, any remote sensor connected to the terminal 39 must have a high output state during normal operation and switch to a low output state upon the occurence of some abnormal condition in which it is desirable to activate an alarm. A resistor 121 is connected to the base terminal 122 of the transistor 120, with the other terminal of the resistor 121 connected to the voltage supply terminal 51. Thus, in normal operation, current through resistor 121 will drive transistor 120 into a conductive state. A base terminal of the transistor 120 is referenced to ground and a collector terminal 124 is referenced to the voltage source terminal 51 through a resistor 125. Thus, when the base drive for the transistor 120 through the resistor 121 is diverted by a out-of-tolerance condition or abnormal circuit operation, transistor 120 assumes an off or nonconductive condition. Since the collector terminal 124 of the transistor 120 is also connected to an anode terminal of a light emitting diode 126 and to an input terminal 127 of an audio oscillator circuit 128, the light emitting diode 126 begins to emit light for a visual alarm and the audio oscillator circuit 128 has its input terminal 127 enabled to begin oscillation for the provision of an audible alarm. It will be appreciated that other types of visual alarm means, besides the light emitting diode 126, can be provided, such as an incandescent lamp or the like.

The audio oscillator circuit 128 is connected to the power supply terminal 151 by a lead 129 and to ground by lead 130. The circuit 128 can take various forms since a wide variety of oscillators are known to the electronics art. The embodiment illustrated in FIG. 2 utilizes an integrated circuit such as the circuit 95, previously discussed. A first capacitor 131 references a terminal 132 of the circuit 128 to ground. A second capacitor 133 in combination with resistors 134 and 135, all connected in series between power supply terminal 51 and ground, will determine the oscillation frequency of the circuit 128 which will be a fixed tone. Terminal 136 of the circuit 128 is connected to a junction 137 between the resistors 134, 135. Similarly, terminals 138, 139 are connected to a junction 140 between the resistor 135 and the capacitor 133. The output of the oscillator circuit 128 is provided on a lead 141.

The output on lead 141 may be fed back into the audio circuitry portion 15 (FIG. 1) of the radio receiver 11. This avoids the need for amplification circuitry, speakers and the like to produce the audible alarm. If this approach is used, it is preferable to interpose volume control means in between the lead 141 and the audio circuitry 15 such that the volume of the alarm signal can be independently controlled from the volume control of the radio receiver 11. An appropriate volume control comprises an adjustable resistor 145 connected between the lead 141 and ground. The resistor 145 has an adjustable wiper arm 146 to select a suitable audio level. Connected in series between the wiper arm 146 and the audio circuitry 15 is an RC circuit consisting of a capacitor 147 and a resistor 148. The capacitor 147 blocks any DC conduction between the alarm circuitry 37 and the audio circuitry 15 and the resistor 148 is selected to obtain appropriate alarm signal transmission to the audio circuitry 15 without interfering therewith.

Use of the above disclosed circuitry also involves the practicing of a method. A first step involves input signal conditioning to recover the DC component of a detected IF signal from a demodulator portion of a radio receiver. The conditioning step may also include a level shifting step such that the DC component is shifted to a nonzero nominal potential. The next step is comparing the DC component to a voltage reference which is representative of the maximum permissible frequency deviation from the nominal transmitting frequency. Simultaneously, another comparison step in comparing the DC component to another voltage reference which is representative of the maximum permissible frequency deviation from the nominal transmitting frequency in an opposite direction, is being performed. A last step includes controlling an alarm to enable said alarm whenever either of the comparison steps senses an out-of-tolerance frequency condition.

Another method involves conditioning an audio signal from the demodulator portion of a radio receiver to recover the audio portion thereof while blocking the DC component. An optional step of adding a known DC level to the recovered audio component may be used to test and monitor the audio component about a nonzero voltage level. The next step involves comparing the audio component to a known voltage reference to determine if an over modulation condition exists and to provide a changed output state whenever said condition exists. A pulse stretching step is utilized next to provide a minimum time duration pulse in response to an over modulation condition. The last step includes controlling an alarm with the stretched pulse. This may include the provision of an inverting step to invert the stretched pulse to a polarity suitable for the alarm.

It will be understood that various changes and modifications may be made without departing from the spirit of the invention as defined in the following claims, and equivalents thereof.

I claim:

1. Monitoring and testing circuitry for attachment to a radio receiver to monitor and test a detected intermediate frequency (IF) signal from a demodulator portion of said radio receiver to determine if a radio signal received from radio transmitting equipment is within permissible modulation limits and circuitry comprising:

AC coupling means for receiving the detected IF signal and for blocking the DC component thereof while passing the audio frequencies;

a modulation voltage reference related in magnitude to the maximum permissible modulation level of the radio signal;

comparator means for comparing the audio signal from the AC coupling means to the modulation voltage reference, said comparator changing an output state whenever the audio signal exceeds said modulation voltage reference;

pulse stretching means between said comparator means and an alarm means for providing a changed output state of a predetermined interval whenever a changed output state from the comparator means is received by the pulse stretching means such that intermittent as well as continuous over modulation conditions of the radio signal are sensed, said pulse stretching means having an output; and said alarm means being responsive to the output of said pulse stretching means for indicating when either intermittent or continuous over modulation of the radio signal exists.

2. The circuitry of claim 1 wherein said AC coupling means comprises a capacitor in series connection between the demodulator of the radio receiver and the comparator means of the over modulation detector means.

3. The circuitry of claim 2 wherein said AC coupling means further comprises a pair of voltage dividing resistors connected to the capacitor between the capacitor and the comparator means to add a nonzero DC level to the audio signal.

4. The circuitry of claim 1 wherein said pulse stretching means comprises a timing circuit of the type which provides a changed output signal for a predetermined interval of time whenever an input signal thereto changes a state even if only for an intermittent period of time.

5. The circuitry of claim 1 wherein signal inverting means are interposed between the pulse stretching means and the alarm means to invert the output state of the pulse stretching means.

6. The method of monitoring and testing a radio frequency signal from a transmitter to determine if the radio signal is within permissible modulation limits by monitoring and testing an audio signal from a demodulator portion of a radio receiver which is tuned to the desired transmitting frequency wherein a pulse stretching means is provided between a comparator means and an alarm means, said method comprising:

conditioning the audio signal to recover the AC component thereof while blocking the DC component thereof;

comparing the AC component recovered from the audio signal to a voltage reference indicative of the maximum permissible modulation level to determine if an over modulation condition exists;

stretching any pulses from the comparison of said AC component to said voltage reference which are indicative of an over modulation condition to a minimum time width pulse; and controlling said alarm means with the minimum time width pulses.

7. The method as in claim 6 including the additional step of level shifting the AC component of the audio signal to a known nonzero DC level before comparing said AC component to said voltage reference.

* * * * *